United States Patent [19]
Stover

[11] 3,822,028
[45] July 2, 1974

[54] FUEL TANK CONSTRUCTION
[75] Inventor: David Emmert Stover, Dubuque, Iowa
[73] Assignee: Deere & Company, Moline, Ill.
[22] Filed: Nov. 28, 1972
[21] Appl. No.: 310,113

[52] U.S. Cl. ............... 220/20, 220/1 B, 210/532 R
[51] Int. Cl. ...................... B65d 1/24, B01d 43/00
[58] Field of Search .......... 220/1 B, 20, 20.5; 232/1, 232/43.1; 209/155, 157, 461, 158; 210/513, 521, 525, 532 R, 532 S

[56] References Cited
UNITED STATES PATENTS
| | | | |
|---|---|---|---|
| 636,675 | 11/1899 | Latimer | 209/158 |
| 2,208,621 | 7/1940 | Ball et al. | 220/1 B |
| 2,539,820 | 1/1951 | Duchesneau | 210/532 |
| 2,708,517 | 5/1955 | Evans | 209/158 |

FOREIGN PATENTS OR APPLICATIONS
| | | | |
|---|---|---|---|
| 588,757 | 11/1933 | Germany | 210/532 |
| 1,052,360 | 3/1959 | Germany | 210/521 |
| 554,253 | 1/1957 | Italy | 210/532 |
| 538,976 | 11/1931 | Germany | 210/532 |
| 22,207 | 7/1930 | Netherlands | 220/1 B |

*Primary Examiner*—William I. Price
*Assistant Examiner*—Joseph Man-Fu Moy

[57] ABSTRACT

A fuel tank has a sediment trap in one end thereof which is constructed in conjunction with a fuel withdrawal or suction tube so as to minimize the remixing of trapped sediment with the fuel being withdrawn during operation of the vehicle.

11 Claims, 1 Drawing Figure

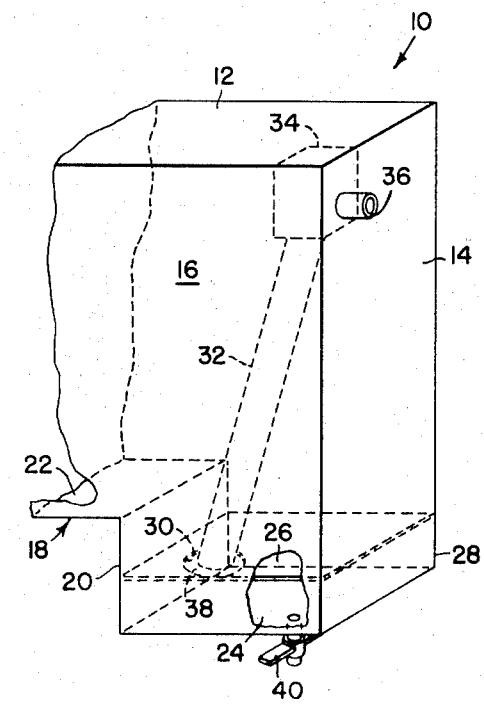

3,822,028

FUEL TANK CONSTRUCTION

BACKGROUND OF THE INVENTION

The present invention relates to a vehicle fuel tank and more particularly relates to a fuel tank for use on an off-the-road vehicle, the tank being constructed so as to minimize the passage of any sediment in the tank through the fuel suction tube and into the fuelling system of the tractor.

Fuel in the tank of an off-the-road vehicle such as a logging skidder or the like is mixed during operation of the skidders and when refuelling. This mixing of the fuel in the tank prevents separation of water and foreign material from the fuel. In conventional fuel tank designs, these suspended foreign materials are drawn into the fuel line causing premature clogging of the fuel filters. While idleness for several hours permits these contaminants to settle out, they will go into suspension again once operation is resumed unless they are first drained from the tank.

SUMMARY OF THE INVENTION

According to the present invention, there is provided a fuel tank design which improves sediment control without requiring a change of normal maintenance procedures.

It is an object of the invention to provide a fuel tank which has a sediment trap in one end thereof, the trap having an opening communicating with the remainder of the tank and being large enough to permit easy passage of large material therethrough but having a small effective area which allows only minimal remixing of the material in the sediment trap with the fuel in the remainder of the tank. Specifically, it is an object to provide a sediment trap having an upper horizontal wall serving as a baffle plate dividing the sediment trap from the remainder of the fuel tank and having the aforementioned opening therein and to place the inlet end of a generally upright suction tube in the plane of the opening, the tube being of a size which leaves only a small space between the side of the tube and the opening. A further object is to provide a suction tube as aforedescribed which is long, vertical and of relatively large diameter so the fuel is sucked up out of the tank at a low velocity thus permitting suspended particles to settle out of the suction tube as the fuel leaves the tank.

These and other objects will become apparent from a consideration of the following description and the appended drawing.

BRIEF DESCRIPTION OF THE DRAWING

The sole FIGURE is a perspective view of a portion of a fuel tank embodying the present invention.

DESCRIPTION OF THE PREFERRED EMBODIMENT

Referring now to FIG. 1, therein is shown a vehicle fuel tank indicated in its entirety by the reference numeral 10. The fuel tank 10 is particularly suited for use on any off-the-road vehicle which, during operation, must of necessity traverse obstacles and/or uneven terrain resulting in the fuel contained within the tank 10 being mixed.

The fuel tank 10 as represented here is of a generally box-like construction comprising a horizontal top wall 12, a vertical end wall 14 and opposite side walls 16 (only one side wall being shown). As viewed in the drawing, the lower right end portion of the side walls 16 is stepped downwardly and a bottom tank wall 18 joins the bottom of the side wall 16 and includes a vertically extending step portion 20 which extends parallel to the end wall 14. Thus, the vertical portion 20 of the bottom wall 18 connects right and left end portions respectively of an upper or first horizontal portion 22 and a lower or second horizontal portion 24. Extending parallel to the second portion 24 at a level in between that of the second portion 24 and the first portion 22 is a generally rectangular baffle plate 26 having its edges secured to the end wall 14, the side walls 16 and the vertical portion 20 of the bottom wall 18, the baffle plate and end, side and bottom walls thus cooperating to define a sediment trap 28 in the bottom of the fuel tank 10. Extending through the baffle plate 26 and providing the sole fluid communication of the sediment trap with the remainder of the fuel tank is a circular opening 30. Centered within and being at the same level as the opening 30 is the bottom end or inlet end of a fuel suction tube 32 which projects upwardly at a steep angle from the opening 30 to the top of the tank whereat it is connected to a fitting 34 from which a supply line 36 extends through the end wall 14 of the fuel tank.

The fuel suction tube 32 is dimensioned so as to leave a relatively small annular space between it and the opening 30 thus resulting in there being an opening large enough for the passage of relatively large particles while at the same time defining a relatively small effective area which allows only minimal remixing of any trapped sediment with the fuel in the remainder of the tank.

It is also to be noted that the tube 32 is considerably larger in diameter than the supply line 36, the diameter of the suction tube being chosen such that the fuel being sucked up out of the tank travels at a relatively low velocity thus permitting suspended particles to settle out of the fuel as the latter leaves the tank.

In order to flush sediment from the sediment trap 28, the latter is provided with a drain valve 40 which is of a known construction permitting unrestricted flow so that large material will be flushed from the trap by the fast-flowing liquid.

The operation of the fuel tank construction is thought to be evident from the foregoing description and no further description is given for the sake of brevity.

I claim:

1. A vehicle fuel tank comprising: a bottom tank wall being integral with tank side walls and including a first portion located at a level above a second portion and joined thereto by a connecting wall means; a baffle plate spaced vertically above and extending generally parallel to the second bottom wall portion at a level below said first bottom wall portion; said baffle plate being joined to said side walls and connecting wall means and cooperating therewith to form a sediment trap in the lowermost portion of the tank; an opening being located in said baffle plate and being the sole means by which fuel and foreign material, if any, may pass between the sediment trap and the remainder of the fuel tank; an elongate fuel withdrawal tube including a bottom end having a cross-sectional area less than and being located in said opening at the level of said baffle plate, and including an upper end extending to the exterior of the upper portion of the fuel tank.

2. The fuel tank defined in claim 1 wherein said sediment trap is located at one end of the fuel tank.

3. The fuel tank defined in claim 1 wherein said opening is circular and said tube is circular in cross section and located centrally in said opening thereby defining an annular passage for permitting fuel and any foreign material pass between the sediment trap and the remainder of the fuel tank.

4. The fuel tank defined in claim 1 wherein said withdrawal tube has a straight generally upright portion of considerable length extending from said bottom end and being of a cross-sectional dimension chosen such that for a predetermined suctional force applied to the tube the velocity of the fuel passing through the upright portion will be low, whereby any heavy foreign material which might find its way into the tube due to fuel splashing during operation of the vehicle will settle out into the sediment trap.

5. The fuel tank defined in claim 1 wherein the height of said sediment trap constitutes no more than one-fifth of the total height of the tank at said sediment trap.

6. The fuel tank defined in claim 1 and further including drain valve means connected to the bottom of said sediment trap for permitting sediment to be flushed from the trap upon opening said valve means.

7. A vehicle fuel tank comprising: integral top, side and bottom walls, said bottom wall including first and second portions, the second portion being located at a level below the first portion and joined thereto by a connecting wall means; a baffle plate being spaced vertically above the second bottom wall portion and being below the level of said first bottom wall portion; said baffle plate having marginal edges fixed integrally with the tank side walls and said connecting wall means; an aperture extending vertically through said baffle and a sole passage through said baffle; a suction tube extending upwardly from said aperture and having its bottom end terminating within said aperture in a plane containing said baffle plate; and the one relative dimension of the aperture and tube being such that a small space exists between the edge of the aperture and the tube.

8. A vehicle fuel tank comprising: a hollow box-like walled structure having a stepped bottom being integral with vertical side walls and consisting of a main horizontal section having one edge integral with a vertical interconnecting section which in turn has one edge integral with a horizontal end section; a horizontal rectangular baffle plate extending parallel above said end section and having marginal edges integrally joined to said vertical interconnecting section and said side walls at a level below said main section of the bottom to thus form a sediment trap in the bottom of the tank; an opening being located in said baffle plate and being the sole means by which fuel and foreign material, if any, may pass between the sediment trap and the remainder of the tank; a suction tube extending upwardly from said aperture and having its lower end terminating within said aperture in the plane of said baffle plate; and the relative dimensions of the aperture and tube being such that a small space exists between the edge of the aperture and the tube.

9. The fuel tank defined in claim 8 wherein said suction tube has a straight generally upright portion of considerable length extending from said bottom end and being of a cross-sectional dimension chosen such that for a predetermined suctional force applied to the tube the velocity of the fuel passing through the upright portion will be low, whereby any heavy foreign material which might find its way into the tube due to fuel splashing during operation of the vehicle will settle out into the sediment trap.

10. The fuel tank defined in claim 9 and further including drain valve means connected to the bottom of said sediment trap for permitting sediment to be flushed from the trap upon opening said valve means.

11. A vehicle fuel tank comprising: a container defining a sediment trap in the lowermost portion thereof; said sediment trap having a top wall defining a baffle plate; an opening being located in said baffle plate and being the sole means by which fuel and foreign material, if any, may pass between the sediment trap and the remainder of the fuel tank; an elongate fuel withdrawal tube including a bottom end having a cross-sectional area less than and being located in said opening at the level of said baffle plate, and including an upper end extending to the exterior of the upper portion of the fuel tank.

* * * * *